Aug. 15, 1950     L. VANDERHOOFVEN, SR     2,518,962
RADIALLY ARRANGED ROTARY DISK SLICER FOR CORED FRUIT
Filed June 23, 1948     2 Sheets-Sheet 1
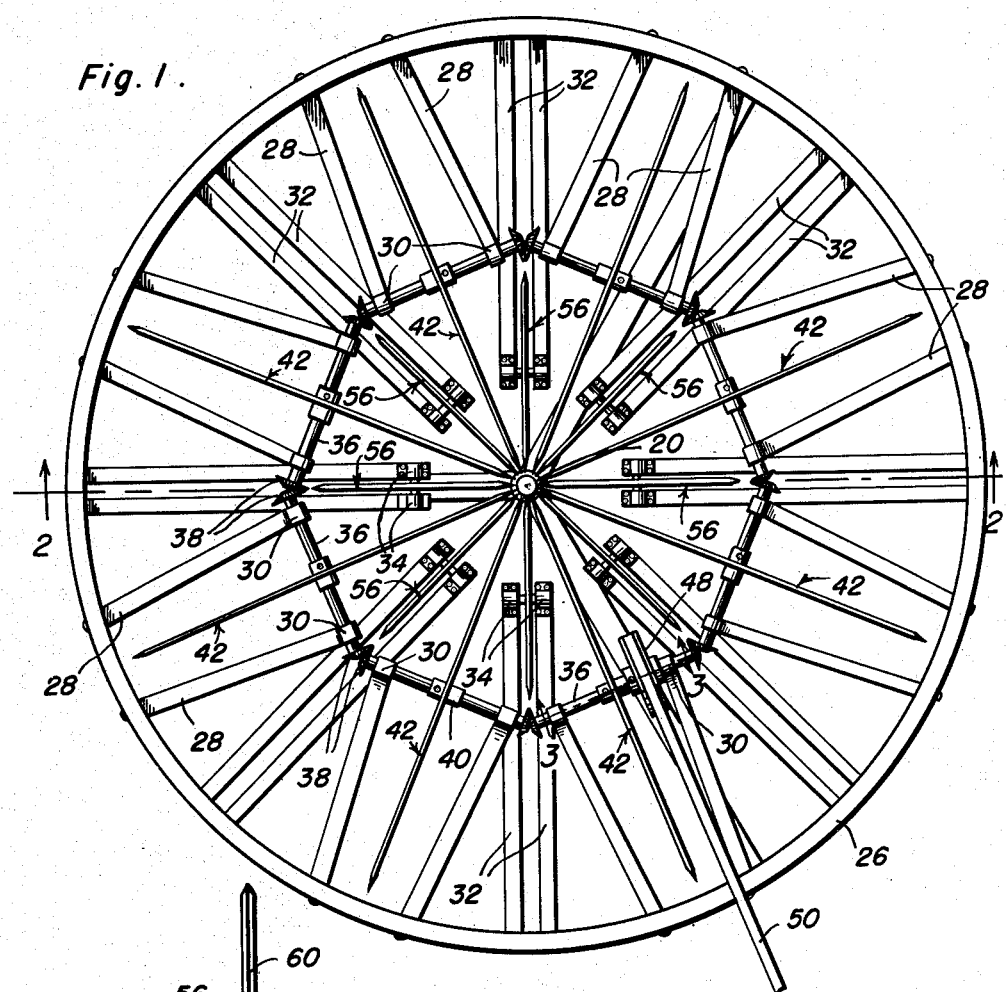
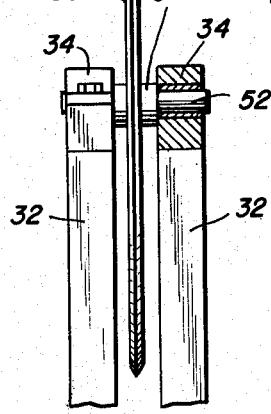
Leonard Vanderhoofven, Sr.
INVENTOR.

Aug. 15, 1950     L. VANDERHOOFVEN, SR     2,518,962
RADIALLY ARRANGED ROTARY DISK SLICER FOR CORED FRUIT
Filed June 23, 1948     2 Sheets-Sheet 2
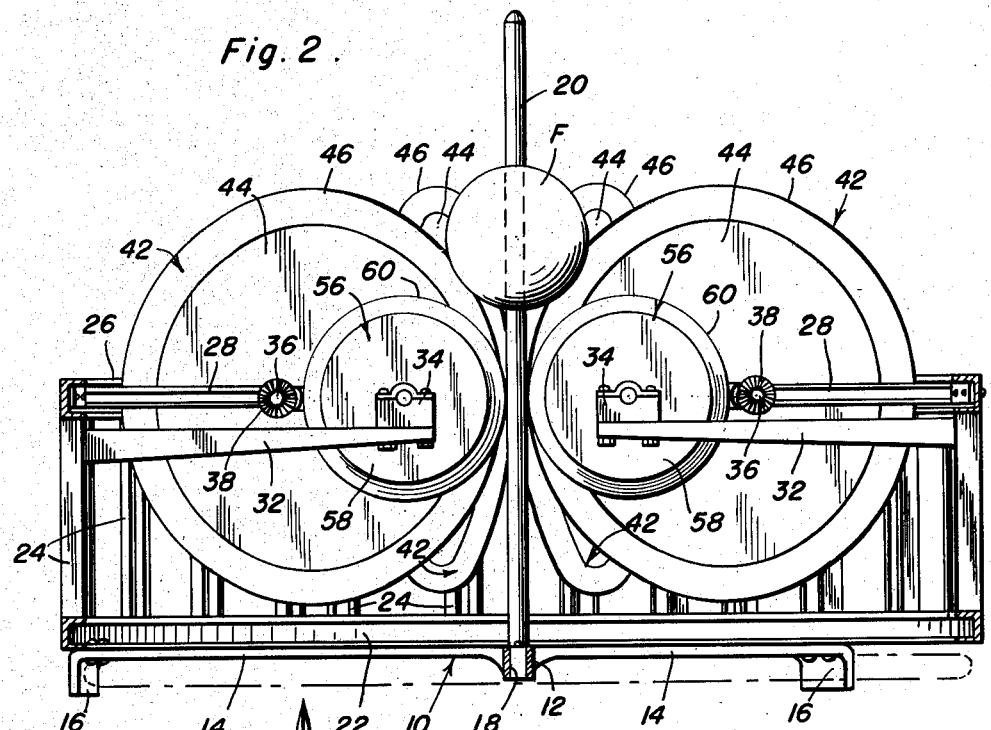
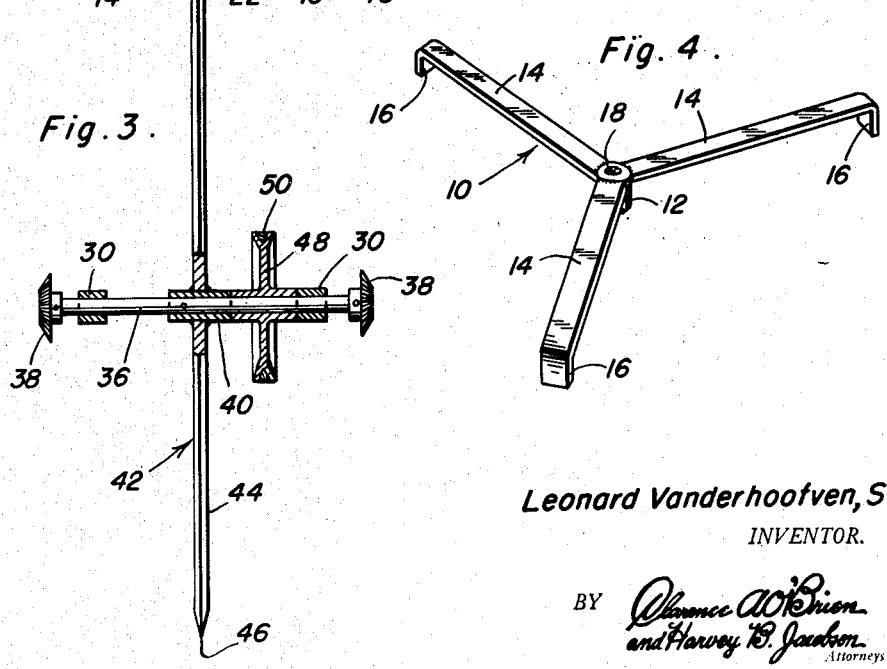
Leonard Vanderhoofven, Sr.
*INVENTOR.*
BY *Clarence A. O'Brien
and Harvey B. Jackson*
*Attorneys*

Patented Aug. 15, 1950

2,518,962

UNITED STATES PATENT OFFICE 2,518,962

RADIALLY ARRANGED ROTARY DISK SLICER FOR CORED FRUIT

Leonard Vanderhoofven, Sr., Delta, Colo., assignor of fifty per cent to Earl E. Dunston, Delta, Colo.

Application June 23, 1948, Serial No. 34,591

2 Claims. (Cl. 146—99)

This invention relates to a slicer for cored fruit or the like and has for its primary object rapidly to slice cored apples and like objects into a multiplicity of pieces suitable for canning, pie making and the like.

Another object is to enable the slicer to be placed over a suitable receptacle so that it may be rapidly transferred from one receptacle to another, as the receptacles become filled with slices of fruit or the like.

A still further object is to feed cored fruit in succession through the slicer, employing the frictional contact of the rotating slicer blades with the fruit to propel the fruit through the slicer.

The above and other objects may be attained by employing this invention which embodies among its features a guide pin along which cored bodies such as cored apples are advanced toward a plurality of circular cutters arranged about the guide pin with the peripheries thereof adjacent the guide pin, means to rotate the cutters and cause the peripheries thereof adjacent said guide pin to travel toward the discharge end of the slicer and auxiliary circular cutters mounted between the first mentioned rotary cutters with the peripheries adjacent the guide pin.

Other features include a supporting spider upon which the guide pin and cutters are supported and through which the slices of fruit may fall into any convenient receptacle.

In the drawings:

Figure 1 is a top plan view of a slicer embodying the features of this invention, Figure 2 is a transverse sectional view taken substantially along the line 2—2 of Figure 1, Figure 3 is a sectional view taken substantially along the line 3—3 of Figure 1, Figure 4 is a perspective view of the supporting spider, and Figure 5 is an enlarged detail view of one of the auxiliary cutters illustrating one of the bearing members thereof in section more clearly to illustrate the details of construction.

Referring to the drawings in detail a spider designated generally 10 comprises a central hub member 12 from which arms 14 radiate. Each arm 14 is provided adjacent its outer end with a downturned lug 16 which as illustrated in Figure 1 is adapted to engage the top bead of a suitable receptacle into which the slices are discharged from the slicer. The hub 12 is provided with an axial bore 18, and fitted in the bore 18 and extending upwardly from the hub 12 is a guide pin 20 upon which the cored fruit F is threaded.

Riveted or otherwise rigidly secured to the upper faces of the arms 14 in spaced concentric relation to the guide pin 20 is a channel shaped ring 22 carrying at peripherally spaced intervals upwardly extending legs 24 on which a similar channel shaped ring 26 is supported in spaced parallel relation to the ring 22 as will be readily understood upon reference to Figure 2. Secured to the ring 26 and extending inwardly therefrom are pairs of arms 28. As illustrated in Figure 1 the arms 28 of each pair diverge as they recede from the ring 26 and are equipped adjacent their inner ends with suitable journal bearings 30 the purpose of which will be more fully hereinafter explained. The axes of the journal bearings of each pair of arms 28 lie in the same horizontal plane. Fixed to certain of the standards 24, and extending inwardly therefrom in spaced parallel relation to radii which intersect the axis of the pin 20 are horizontal arms 32 which carry adjacent their inner ends journal bearings 34 for a purpose to be more fully hereinafter described. It is to be noted that the journal bearings 30 lie substantially midway between the axis of the pin 20 and the inner periphery of the ring 26. It is also to be noted that the journal bearings 34 are of sufficient height, that the axis of the openings therethrough lie in the same horizontal plane with the axes of the openings in the journal bearings 30 previously mentioned.

Mounted for rotation in the journal bearings 30 are axle shafts 36, opposite ends of which project through the journal bearings and beyond the sides of the divergent arms 28 and each end of each shaft is equipped with a beveled drive pinion 38, each of which meshes with the drive pinion of an adjacent shaft, so that when one of the shafts is rotated the other shafts will be moved in unison therewith. Fixed to each shaft 36 substantially midway between opposite ends is the hub 40 of a rotary cutter designated generally 42 each of which comprises a circular disk 44 equipped with a peripheral cutting edge 46, and these disks lie radial to the pin 20 with their peripheries operating adjacent said pin as will be readily understood upon reference to Figure 1. A suitable drive pulley 48 is fixed to one of the shafts 36 between its cutter 34 and one of the journal bearings 30, and this drive pulley 48 has driving connection with a suitable prime mover (not shown) through the medium of a conventional endless drive belt 50. It will be understood of course that the drive belt 50 is moved in such a direction as to cause the shafts 36 to rotate their respective cutters in a direction so that the peripheries thereof adjacent the guide pin 20 move downwardly toward the spider 10 so that fruit threaded on the guide pin and falling downwardly will contact the cutting edges 46 of the cutters and through the frictional contact of the cutters with the fruit, it will be fed through the slicer.

Mounted for rotation in each pair of journal bearings 34 transversely of the radius on opposite sides of which the respective pair of supporting arms 32 lie is an idler shaft 52 upon which is supported between adjacent journal bearings 34 the hub 54 of a cutter designated generally 56. Each cutter 56 comprises a disk 58 which is of a diameter slightly less than one half the diameter of the cutters 42 previously described, and each disk 58 is provided at its periphery with a cutting edge 60, which lies substantially along a radius which intersects the axis of the pin 20. The peripheries of the auxiliary cutters 56 operate adjacent the pin 20 and between the peripheries of adjacent cutter disks 42, so that as the cored fruit is fed through the slicer and cut into slices by the cutters 42 the cutters 56 will also serve to slice slices formed by the cutters 42 into smaller slices. Inasmuch as all of the cutters lie radial to the pin 20, and are uniformly circumferentially spaced, it will be evident that the fruit fed along the pin 20 will be cut into slices of uniform size.

In operation it will be understood that the slicer is placed over the open top of any suitable receptacle in such a manner that the spider 10 rests on the upper edge of the receptacle, and the pin 20 lies along an axis which coincides substantially with the axis of the receptacle. Upon operating the drive belt 50, it will be evident that the cutters 42 will be rotated, and as previously explained in such a direction that the peripheries of the cutters 42 adjacent the guide pin 20 move downwardly toward the spider 10. Cored fruit threaded on the upper end of the guide pin will then fall by gravity toward the cutters, first encountering the cutters 42 which being driven will tend to propel the fruit toward the spider. Obviously as the fruit advances it will encounter the cutters 56, and by reason of the arrangement of the cutters 42 and 56 it will be severed into a multitude of slices and subsequently discharged into the receptacle.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A slicer for cored fruit comprising a spider including radial arms, means formed on the ends of the arms for supporting the spider on the upper open end of a receptacle, a vertical guide pin extending upwardly from the midpoint of the spider, a ring vertically spaced above and supported on the top of the spider in spaced concentric relation to the guide pin, supporting arms extending inwardly from the ring, shafts journaled transversely on the innermost ends of the arms to rotate about axes which lie in a common horizontal plane, a circular rotary cutter mounted on each shaft to rotate therewith through an arc which lies radial to the guide pin, intermeshing pinions mounted on adjacent ends of the shafts, a drive pulley on one of the shafts for rotating the shafts and their respective cutters and the peripheries of the cutters lying adjacent the guide pin, idler cutters interposed between the rotary cutters and means mounted on the ring for supporting the idler cutters with their peripheries lying adjacent the guide pin.

2. A slicer for cored fruit comprising a spider including radial arms, means formed on the ends of the arms supporting the spider on the upper open end of a receptacle, a vertical guide pin extending upwardly from the midpoint of the spider, a ring vertically spaced above and supported on the top of the spider in spaced concentric relation to the guide pin, supporting arms extending inwardly from the ring, shafts journaled transversely on the innermost ends of the arms to rotate about axes which lie in a common horizontal plane, a circular rotary cutter mounted on each shaft to rotate therewith through an arc which lies radial to the guide pin, intermeshing pinions mounted on adjacent ends of the shafts, a drive pulley on one of the shafts for rotating the shafts and their respective cutters, the peripheries of the cutters lying adjacent the guide pin, intermediate groups of arms extending inwardly from the ring toward the guide pin and idler circular cutters rotatably carried by the intermediate groups of arms to rotate between the rotary cutters, the peripheries of the idler cutters lying adjacent the guide pin.

LEONARD VANDERHOOFVEN, Sr.

REFERENCES CITED

The following references are of record in the file of this patent:

UNITED STATES PATENTS

| Number | Name | Date |
|---|---|---|
| 250,869 | Arave | Dec. 13, 1881 |
| 1,389,270 | Pratt | Aug. 30, 1921 |
| 1,825,629 | Floyd | Sept. 29, 1931 |